(12) United States Patent
Humphries et al.

(10) Patent No.: US 7,546,900 B2
(45) Date of Patent: Jun. 16, 2009

(54) PANEL ASSEMBLY FOR TRAFFIC NOISE BARRIER WALL

(75) Inventors: Eric C. Humphries, Meriden, CT (US); Stephen D. Barratt, Long Valley, NJ (US); Ray Stauffer, Camp Hill, PA (US); Paul D. Nowicki, Manalapan, NJ (US); John H. Miller, Southampton, NJ (US)

(73) Assignee: Evonik Cyro LLC, Parsippany, NJ (US)

( * ) Notice: Subject to any disclaimer, the term of this patent is extended or adjusted under 35 U.S.C. 154(b) by 312 days.

(21) Appl. No.: 10/777,442

(22) Filed: Feb. 12, 2004

(65) Prior Publication Data

US 2005/0178613 A1 Aug. 18, 2005

(51) Int. Cl.
*E04B 1/82* (2006.01)
(52) U.S. Cl. .................. 181/286; 181/284; 181/285; 181/289; 52/144; 52/145
(58) Field of Classification Search .......... 181/284, 181/289, 285, 210; 404/6, 8; 52/144, 145
See application file for complete search history.

(56) References Cited

U.S. PATENT DOCUMENTS

| | | | |
|---|---|---|---|
| 4,143,495 A | 3/1979 | Hintz | 52/145 |
| 4,194,329 A | 3/1980 | Wendt | 52/145 |
| 4,214,411 A * | 7/1980 | Pickett | 52/144 |
| 4,306,631 A | 12/1981 | Reusser | 181/210 |
| 4,605,090 A | 8/1986 | Melfi | 181/210 |
| 4,891,920 A * | 1/1990 | Pingston | 52/145 |
| 5,015,119 A | 5/1991 | Schmanski | 404/12 |
| 5,052,850 A | 10/1991 | Bishop | 404/6 |
| 5,208,585 A | 5/1993 | Sprague | 340/908.1 |
| 5,406,039 A * | 4/1995 | Rerup et al. | 181/210 |
| 5,678,950 A | 10/1997 | Junker | 404/10 |
| 5,832,674 A * | 11/1998 | Ledbetter et al. | 52/58 |
| 5,942,736 A * | 8/1999 | Cortonesi | 181/289 |
| 5,965,852 A * | 10/1999 | Roschke | 181/210 |
| 5,984,044 A * | 11/1999 | Christensen | 181/210 |
| 6,196,352 B1 * | 3/2001 | Goodchild | 181/290 |
| 6,253,872 B1 * | 7/2001 | Neumann | 181/210 |
| 6,314,687 B1 * | 11/2001 | Schondelmayer et al. | 52/63 |

(Continued)

OTHER PUBLICATIONS

"Safety-Run-Off-Road Hardware Longitudinal Barriers," U.S. Department of Transportation Federal Highway Administration website (http://safety.fhwa.dot.gov/fourthlevel/hardware/longbarriers.htm), Sep. 19, 2003 (1 page).

(Continued)

*Primary Examiner*—Jeffrey Donels
*Assistant Examiner*—Jeremy Luks
(74) *Attorney, Agent, or Firm*—Wiggin and Dana LLP; Anthony P. Gangemi

(57) ABSTRACT

A panel assembly for a traffic noise barrier wall of the type including opposing slots formed in pairs of vertically-mounted posts is described. The panel assembly includes a sheet, which may be transparent, and a frame disposed along at least a portion of the perimeter of the sheet. Side portions of the frame capture at least a portion of the side edges of the sheet and are received within the opposing slots in drop-down fashion.

8 Claims, 8 Drawing Sheets

SECTION C-C

U.S. PATENT DOCUMENTS

| | | | |
|---|---|---|---|
| 6,328,284 B2 | 12/2001 | Wilding | 256/13.1 |
| 6,412,230 B1 | 7/2002 | Zambelli et al. | 52/27 |
| 6,533,250 B2 | 3/2003 | Arthur | 256/13.1 |
| 6,551,011 B1 | 4/2003 | Valentine | 404/6 |
| 6,609,591 B2 | 8/2003 | Wisniewski | 181/285 |
| 6,619,003 B2* | 9/2003 | Von Arx et al. | 52/222 |
| 7,063,184 B1* | 6/2006 | Johnson | 181/290 |
| 2001/0014254 A1 | 8/2001 | Albritton | 404/6 |
| 2002/0023800 A1* | 2/2002 | Ohmori et al. | 181/294 |
| 2002/0127056 A1 | 9/2002 | Muller et al. | 404/6 |
| 2003/0019170 A1* | 1/2003 | Donnelly | 52/144 |
| 2003/0057410 A1 | 3/2003 | Denman et al. | 256/13.1 |
| 2003/0077120 A1 | 4/2003 | Jonsson et al. | 404/6 |
| 2005/0284059 A1 | 12/2005 | Rerup | 52/306 |

OTHER PUBLICATIONS

"*Safety-Run-Off-Road Hardware Bridge Railings*," U.S. Department of Transportation Federal Highway Administration website (http://safety.fhwa.dot.gov/fourthlevel/hardware/bridgerailings.htm), Sep. 19, 2003 (1 page).

E. Keller et al., "*Guidelines for Attachments to Bridge Rails and Median Barriers*" MwRSF Research Report No. TRP-03-98-03, Midwest State's Regional Pooled Fund Research Program, Fiscal Year 1998-1999 (year 9), Research Project No. SPR-3 (017), Pool Fund No. RPFP-99-06, Feb. 26, 2003 (66 pp.).

NCHRP Report 350, H.E. Ross et al., "*Recommended Procedures for the Safety Performance Evaluation of Highway Features*," National Cooperative Highway Research Program, National Academy Press, Washington, D.C. 1993 (with appendices).

Paraglas Soundstop acrylic sheet, © 2002 CYRO Industries.

Projekt Ratingen BRD, Paraglas LS 15 mm (2 pages, not dated).

CYRO News, "Sounding Off About Transparent Highway Noise Barriers," 2004.

* cited by examiner

DETAIL 1

SECTION B-B

SECTION A-A

PLAN - SOUND BARRIER

SECTION C-C

SECTION B-B

PLAN - SOUND BARRIER

SECTION A-A

SECTION C-C

SECTION B-B

PANEL ASSEMBLY FOR TRAFFIC NOISE BARRIER WALL

BACKGROUND OF THE INVENTION

1. Field of the Invention

This invention relates to traffic noise barrier walls. More specifically, this invention relates to panels for traffic noise barrier walls.

2. Description of the Related Art

Traffic noise barrier walls serve to shield otherwise quiet areas from noise caused by automotive, railway, aircraft, marine, or pedestrian traffic. A typical traffic noise barrier wall is from about 4 to 18 feet in height and runs continuously alongside a selected section of a roadway, railway, aircraft runway, waterway, parking lot, walkway, and the like. Such walls are typically constructed of acoustically absorptive or reflective panels supported by vertically mounted posts.

FIG. 1 depicts one common design of a traffic noise barrier wall, which is indicated at 10. In the traffic noise barrier wall of FIG. 1, each panel 12 is constructed of wood or concrete and is supported between an adjacent pair of vertically mounted posts 14, with the side edges 16 of the panel 12 being received within slots 18 disposed in the posts 14 in "drop-down" fashion. That is, the side edges 16 of each panel 12 are aligned with the slots 18 and the panel 12 is lowered between the posts 14 to secure the panel 12 between the posts 14. Examples of such noise barrier walls are found in U.S. Pat. Nos. 5,713,170 and 5,537,788, both issued to Elmore et al. Noise barrier walls of this type are suitably sturdy and effective in reducing highway noise. However, the support posts must be sized to support the substantial weight of the wood or concrete panels under various environmental loads (e.g., wind loads, earthquake loads, etc.). As a result, the support posts found in such noise barrier walls are large and expensive to manufacture. Moreover, if it becomes necessary to increase the height of the wall after the wall has been built, the addition of more concrete or wood panels to the existing post structure is often times impossible due to the inability of the posts to handle the increased load caused by the additional panels. Such an addition in height may be required, for example, as noise regulations become more stringent or as the amount of noise generated by the traffic increases. Therefore, to increase the height of such noise barrier walls, the existing posts must be replaced at great expense.

Yet another drawback to the use of wood or concrete panels in a traffic noise barrier wall is that they block the view of any roadside businesses or scenery from travelers on the roadway. To overcome this deficiency, wall systems employing transparent panels have been developed. For example, U.S. Pat. No. 4,214,411 issued to Pickett describes panels of transparent polycarbonate resin for use as an acoustical barrier wall along a highway. While such wall systems are effective in providing travelers with a view outside the roadway, they typically require unique mounting structures that do not lend themselves to retrofit into the posts commonly used in traffic noise barrier walls.

BRIEF SUMMARY OF THE INVENTION

The above-described and other drawbacks and deficiencies of the prior art are overcome or alleviated by a panel assembly for a traffic noise barrier wall of the type including opposing slots formed in pairs of vertically-mounted posts. The panel assembly includes a sheet of material and a frame disposed along at least a portion of the perimeter of the sheet. Side portions of the frame capture at least a portion of the side edges of the sheet. The side portions of the frame are received within the opposing slots in drop-down fashion. Elastomeric gaskets may be disposed between the frame and surfaces forming the opposing slots, and the sheet may be formed from a transparent material.

In one embodiment, the side portions of the panel assembly each include a base portion disposed outside the side edge of the sheet and first and second flanges extending from the base portion. The flanges form at least a portion of a channel for capturing the side edge of the sheet. The frame may be disposed outside the entire perimeter of the sheet, with the channel formed by the base portion and the first and second flanges capturing each of the top, bottom, and side edges of the sheet. The base portion and the first and second flanges may be formed from a single piece of material. Alternatively, the first and second flanges may be coupled to a surface of the base portion. An elastomeric gasket may cover at least a portion of the side edge of the sheet captured within the channel. The frame may include at least one of a protrusion and a recess disposed thereon for interlocking with a second panel assembly disposed in the opposing slots.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

The invention will be more fully understood from the following detailed description taken in conjunction with the accompanying drawings wherein like elements are numbered alike, and in which.

DETAILED DESCRIPTION

Figure 2:
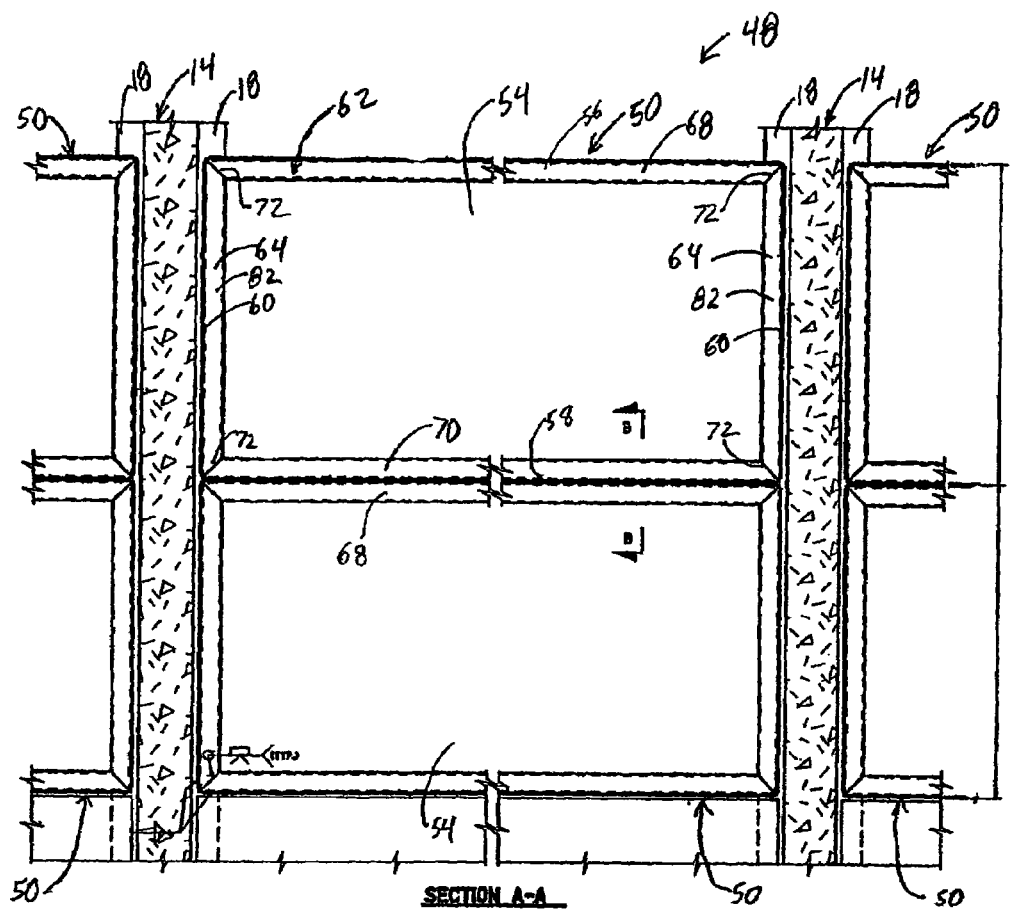
FIG. 2 is a cross-sectional elevation view of a traffic noise barrier wall including panel assemblies of the present invention.
Figure 3:
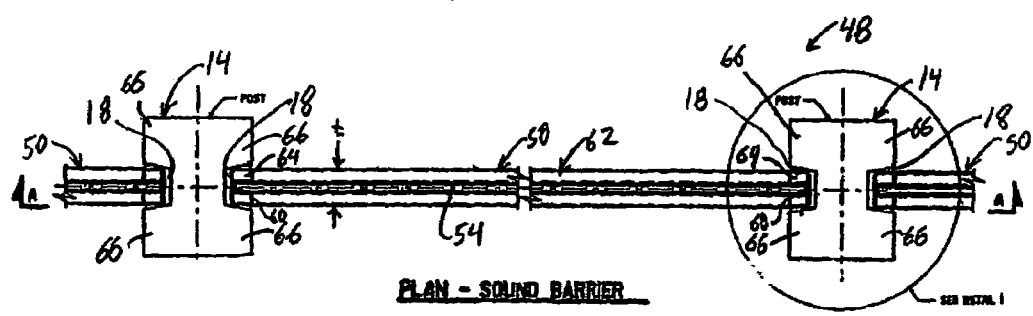
FIG. 3 is a cross-sectional plan view of a traffic noise barrier wall of FIG. 2.

FIG. 2 depicts a cross-sectional elevation view of a traffic noise barrier wall 48 including panel assemblies 50 of the present invention. FIG. 3 is a plan view of the traffic noise barrier wall 48. The traffic noise barrier wall 48 is of the type that serves to shield otherwise quiet areas from noise caused by automotive, railway, aircraft, marine, or pedestrian traffic. The traffic noise barrier wall 48 may be positioned alongside a selected section of a roadway, railway, aircraft runway, waterway, parking lot, walkway, and the like, and has a height that is appropriate for the particular noise abatement requirements of the wall. For example, the height of the noise barrier wall may be from about 4 to 18 feet.

Figure 1:
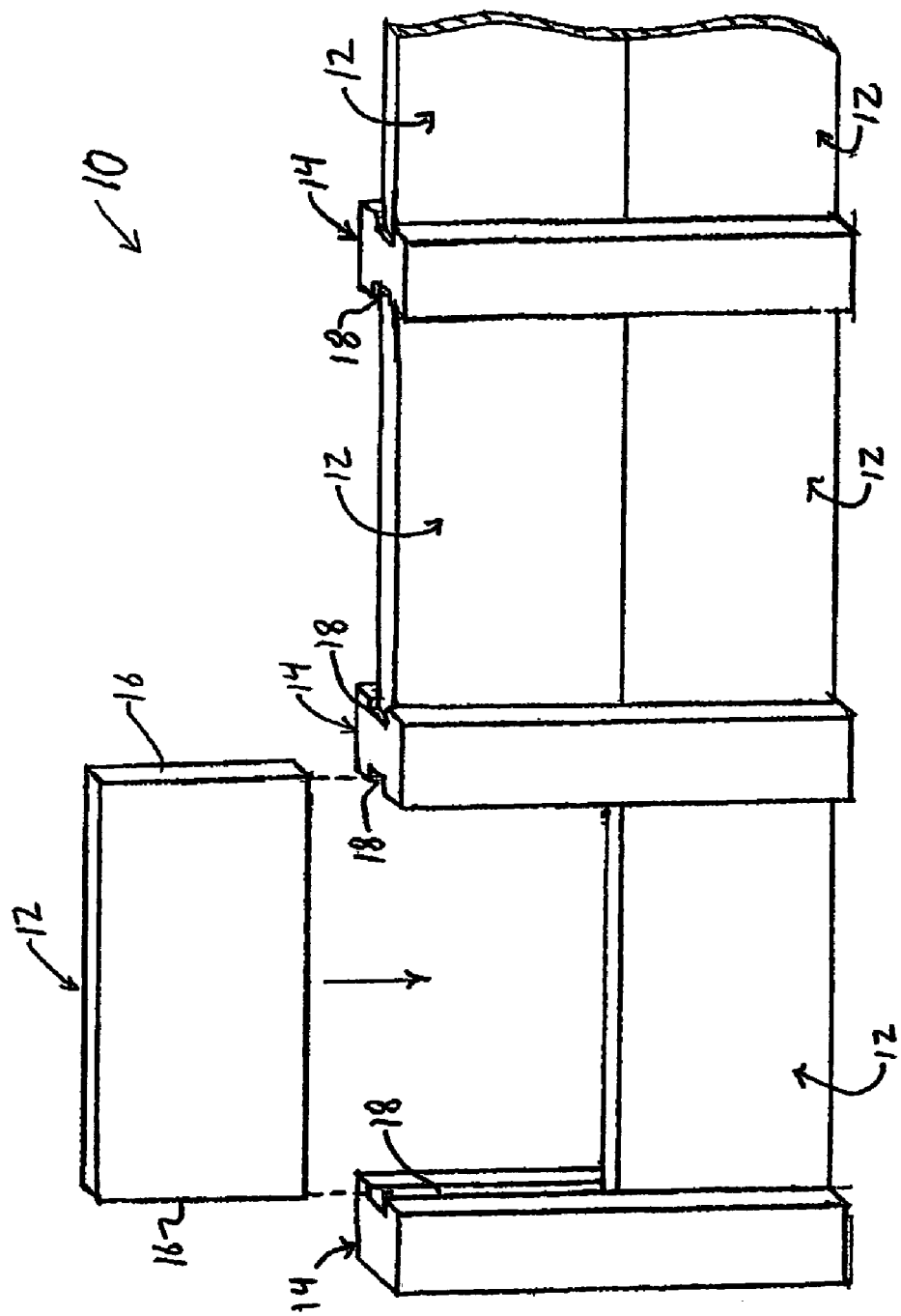
FIG. 1 is a perspective view of a prior art traffic noise barrier wall having panels received between posts in drop-down fashion.

Referring to FIGS. 2 and 3, the noise barrier wall 48 includes spaced-apart, vertically mounted posts 14 having panel assemblies 50 extending between each pair of posts 14. The panel assemblies 50 each include a sheet 54 of material having top 56, bottom 58, and side edges 60 forming a perimeter of the sheet 54, and a frame 62 disposed around the perimeter of the sheet 54. At least a portion of each of the top, bottom and side edges 56, 58, 60 of the sheet 54 may be captured by the frame 62. Side portions 64 of the frame 62 capture at least a portion of the side edges 60 of the sheet 54 and are received within the opposing slots 18 in drop-down fashion. By "drop-down" assembly it is meant that the side portions 64 of each panel assembly 50 are aligned with the slots 18 and the panel assembly 50 is lowered between the posts 14 and within the slots 18 to secure the panel assembly 50 to the vertically mounted posts 14, as depicted in FIG. 1. While, in the embodiment shown, two panel assemblies 50 are disposed between each pair of posts 14, it is contemplated that one or more panel assemblies 50 may be disposed between each pair of posts 14.

The posts 14 may be part of an existing traffic noise barrier wall, with the existing wood or concrete panels 12 (FIG. 1) being replaced with the panel assemblies 50. Alternatively, the posts 14 may be designed specifically for use with the panel assemblies 50. In the posts 14, post flanges 66 extending from the sides of the posts 14 define each of the slots 18. The width of the slots 18 is greater than the thickness "t" of the side portions 64 of the frame 62, with sufficient clearance existing between the frame 62 and the post flanges 66 so that the side portions 64 slide within the slots 18 to allow the drop-down insertion of the panel assemblies 50 into the slots 18. The posts 14 are mounted to a secure base, such as for example, the ground, a concrete platform, a traffic barrier or parapet, or the like. The posts 14 are formed from a rigid material such as, for example, concrete, steel, or wood.

In the embodiment shown, each frame 50 includes a top portion 68, a bottom portion 70, and side portions 64, with each portion 64, 68, and 70 capturing a portion of a respective top, bottom or side edge 56, 58, or 60 of the sheet 54. The ends of each of the portions 64, 68, and 70 interface with the ends of adjacent portions 64, 68 and 70 at mitered joints 72, which form corners of the frame 50. The frame 50 is formed from a rigid material such as, for example, steel, aluminum, fiberglass, plastic and the like. Each mitered joint 72 may be welded, fastened, or otherwise joined to form a continuous, rigid frame 50 around the entire perimeter of the sheet 54.

While frame 50 is shown as including side portions 64 and top and bottom portions 68 and 70 to capture at least a portion of four side edges 56, 58 and 60 of the sheet 54, it is also within the scope of the invention for the frame 50 to only be present on two opposing edges of the sheet 54 or on three edges of the sheet 54. For example, it is contemplated that frame 50 may include only side portions 64 without the top and bottom portions 68 and 70. In this embodiment, only the side edges of the sheet 54 will be captured by the frame 50.

Each sheet 54 is made from an acoustically absorptive and/or reflective material that is appropriate for the individual application of the traffic noise barrier wall 48. For example, sheet 54 may be made of a transparent material where it is desired that travelers on a roadway, railway, aircraft runway, waterway, parking lot, or walkway, adjacent to the wall 48 have a view through the wall 48. One example of a preferred transparent material for use as sheet 54 is PARAGLASS SOUNDSTOPS® acrylic sheet commercially available from CYRO Industries, 100 Enterprise Drive, Rockaway, N.J. Where transparency is not desired, other materials such as wood, steel, opaque acrylic, plastic, and the like, may be used. The sheet 54 may be corrugated or otherwise shaped for added strength.

Figure 4:
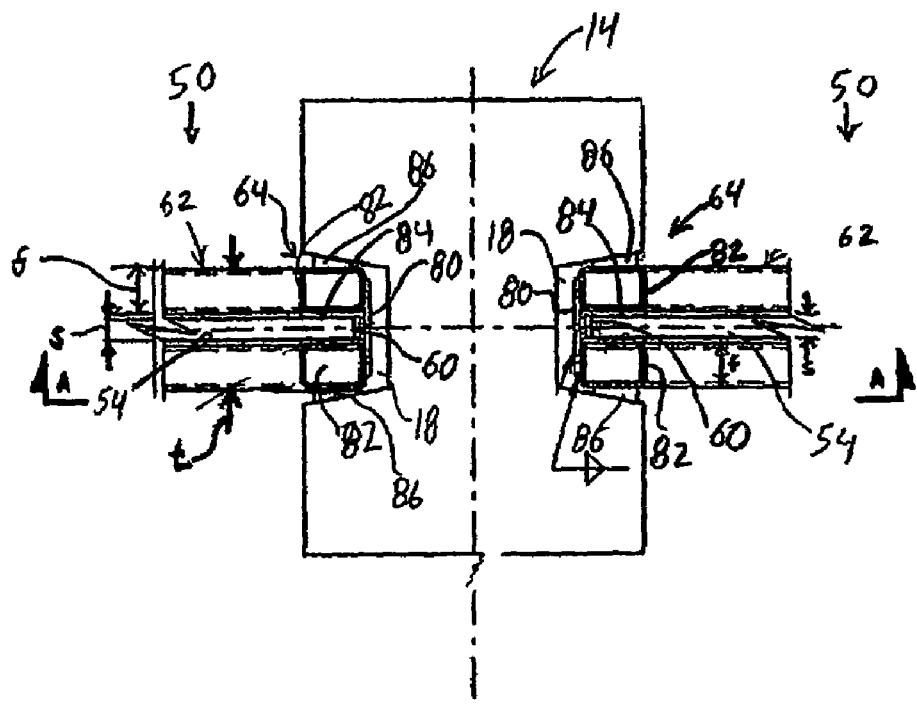
FIG. 4 is a detail view of a portion of the traffic noise barrier wall of FIG. 2.

Referring now to FIG. 4, a cross sectional view of the post 14 and side portions 64 of adjacent frames 62 is shown. Each side portion 64 includes a base portion 80 disposed outside the respective side edge 60 of the sheet 54. Flanges 82 project from the base portion 80 on opposite sides of the sheet 54. The base portion 80 and the flanges 82 form a channel for capturing the side edge 60 of the sheet 54. An elastomeric gasket 84 may cover the side edge 60 of the sheet 54 within the channel to secure the sheet 54 within the channel. The base portion 80 and the flanges 82 are received in the slot 18. As shown in FIG. 2, the flanges 82 may extend along the entire side edge 60 of the sheet 54.

Disposed between each of the flanges 82 of the side portions 64 and the post 14 is an elastomeric gasket 86. The elastomeric gasket 86 takes up any space between the flanges 82 and the post 14.

In dimensioning the frame 50 for a particular application, the thickness "s" of the sheet 54 and the thickness "f" of the flanges 82 can be selected to provide the necessary overall thickness "t" of the frame 50 for the particular application. For example, where the panel assembly 50 is to replace a wood or concrete panel that is thicker than the sheet 54, the thickness "f" of the flanges can be selected such that the overall thickness "t" of the frame 62 is equal to the thickness of the wood or concrete panel that it is to replace. The thickness "s" of the sheet 54 may be substantially less than the width of the slots 18. By "substantially" less than the width of the slots 18, it is meant that the thickness of the sheet 54 is less than 50% of the maximum width of the slots 18, and more preferably less than 30% of the thickness of the slots 18. For example, the maximum width of the slots 18 may be about 4 inches to about 5 inches for accepting a standard wood or concrete panel, and the thickness "s" of an acrylic sheet 54 may be about one inch.

Because the frame 62 supports a relatively thin sheet 54, the panel assembly 50 is much lighter than the wood or concrete panel that it is to replace. As a result, the load applied by the panel assembly 50 to the posts 14 is less than that which would be applied by the wood or concrete panel. Because the load is less, a greater number of panel assemblies 50 can be used in place of the concrete or wood panels. In other words, if it becomes necessary to increase the height of the wall 48, the concrete or wood panels can simply be removed and replaced with a greater number of panel assemblies 50. If the height of the posts 14 is insufficient to accommodate the increased number of panel assemblies 50, extensions can be added to the tops of the posts 18 to support the increased number of panel assemblies 50. In any case, because the panel assemblies 50 are lighter than the wood or concrete panels, the wood or concrete panels can be replaced without having to perform the costly procedure of removing and replacing the posts 14.

Figure 5:
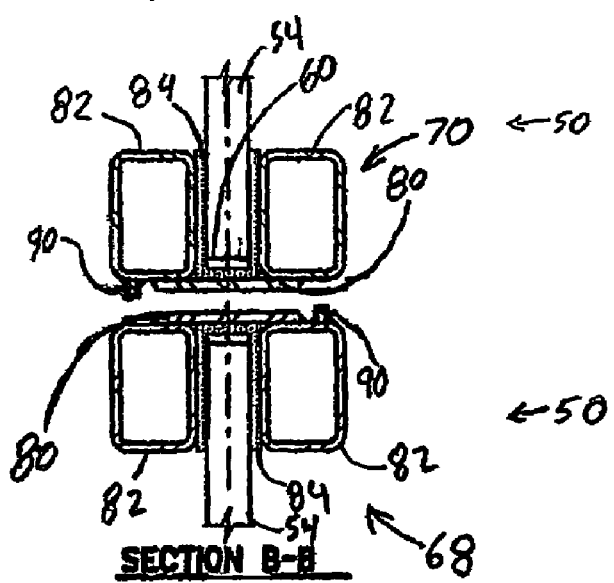
FIG. 5 is a cross-sectional elevation view of a portion of the traffic noise barrier wall of FIG. 2.

Referring to FIG. 5, a cross-sectional view of a bottom portion 70 of one panel assembly 50 is shown proximate a top portion 68 of another panel assembly 50. Such an arrangement may occur when two or more panel assemblies 50 are disposed between a single pair of posts 14, as shown in FIG. 2. Comparison of FIGS. 4 and 5 shows that the cross-section of the side portions 64 of FIG. 4 are substantially similar to the cross-section of the top and bottom portions 68, 70 of FIG. 5. It is contemplated that each of the portions 64, 68 and 70 of the frame 62 are substantially similar in construction, with each having a base portion 80 with flanges 82 extending therefrom, and with the associated edge 56, 68, or 60 of the sheet 54 being captured between the flanges 82.

In the embodiment of FIGS. 4 and 5, the flanges 82 are each formed from tubing, which is coupled by welding, fasteners, or the like to a plate that forms the base portion 80. Preferably, the materials used to make the flanges 82 are the same for each of the top, bottom, and side portions 68, 70 and 64 of the frame 62. That is, a single type of tubing can be cut as needed to form the flanges 82 for any portion of the frame 62. Similarly, the plate used to make the base portion 80 is preferably the same for each of the top, bottom, and side portions 68, 70 and 64 of the frame 62. Using the same materials for each of the top, bottom, and side portions 68, 70, and 64 of the frame 62 allows manufacturing costs of the frame 62 to be reduced. It is also contemplated that to further reduce the manufacturing cost of the frame 62, the flanges 82 can be pre-assembled to the plate that forms base 80, and the entire assembly cut as needed to form any of the top, bottom, or side portions 68, 70 and 64 of the frame 62.

Figure 6:
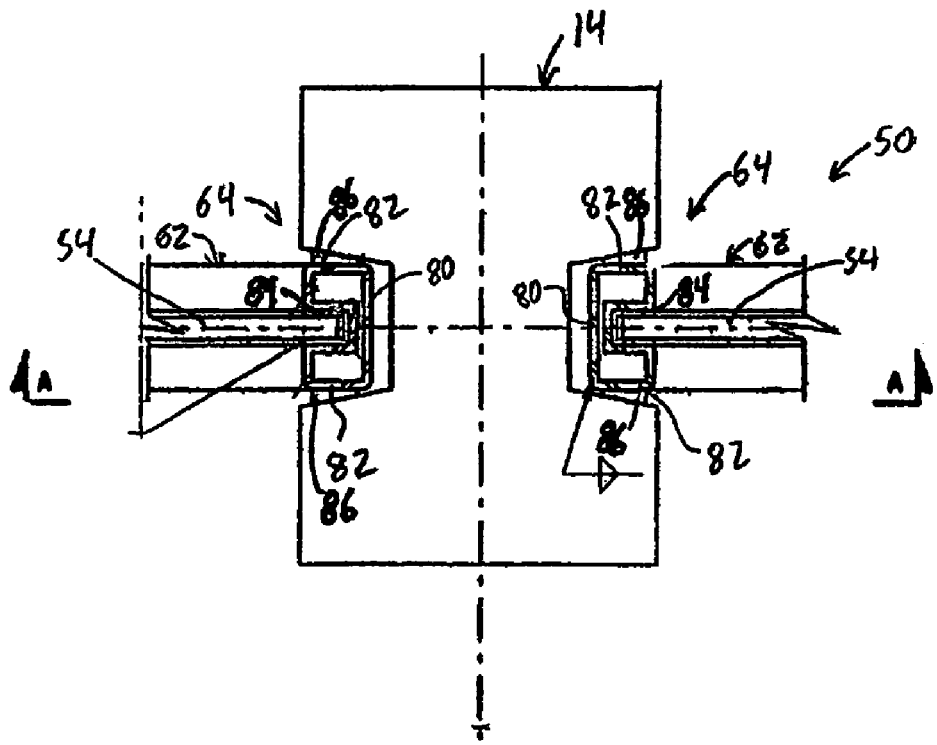
FIG. 6 is a cross-sectional plan view of a portion of an alternative embodiment of the traffic noise barrier wall of FIG. 2.
Figure 7:
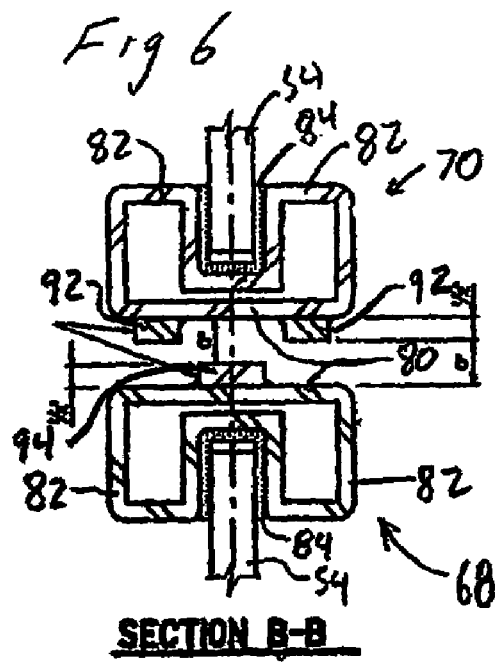
FIG. 7 is a cross-sectional elevation view of a portion of the alternative embodiment of the traffic noise barrier wall of FIG. 2.

FIGS. 6 and 7 depict an alternative construction of frame 62. In the embodiment of FIGS. 6 and 7, each of the top, bottom, and side portions 68, 70 and 64 of the frame 62 are formed by extruding, molding, forging or otherwise shaping a single piece of metal to obtain a unitary structure including the flanges 82 and base portion 80. Similar to the embodiment of FIG. 5, the flanges 82 and the base portion 80 can be pre-formed for use in any of the top, bottom, and side portions 68, 70 and 64 of the frame 62. The formed material can then be cut as needed for any of the portions of the frame 62.

Referring to FIGS. 5 and 7, each panel assembly 50 may include a means for interlocking with an adjacent panel assembly 50 to prevent relative movement of the panel assemblies 50 when they are stacked between posts 14. In the embodiment of FIG. 5, for example, the top portion 68 of one frame 50 and the bottom portion 68 of an adjacent frame 50 each includes a protrusion 90 extending therefrom. The protrusion 90 on the top portion 68 is positioned on one side of its associated base 80, and the protrusion 90 on the bottom portion 70 is positioned on the opposite side of its associated base 80. Each protrusion 90 extends higher than the plate forming its associated base 80 such that when the bottom portion 70 from one panel assembly 50 rests on the top portion 68 of another panel assembly 50, the protrusions 90 capture the plate assemblies there between to prevent relative lateral movement of the panel assemblies 50.

The interlocking means of FIG. 7 includes a pair of protrusions 92 extending from the bottom portion 70 of the frame 62 in one panel assembly 50, and a single protrusion 94 extending from the top portion 68 of the frame 62 in an adjacent panel assembly 50. The single protrusion 94 extends between the pair of protrusions 92 when the bottom portion 70 from one panel assembly 50 rests on the top portion 68 of the other panel assembly 50 to prevent relative lateral movement of the panel assemblies 50. In either the embodiment of FIG. 5 or FIG. 7, the protrusions 90, 92 and 94 may extend along the entire length of the top and/or bottom portions 68, 70 of the frames 62.

Figure 8:
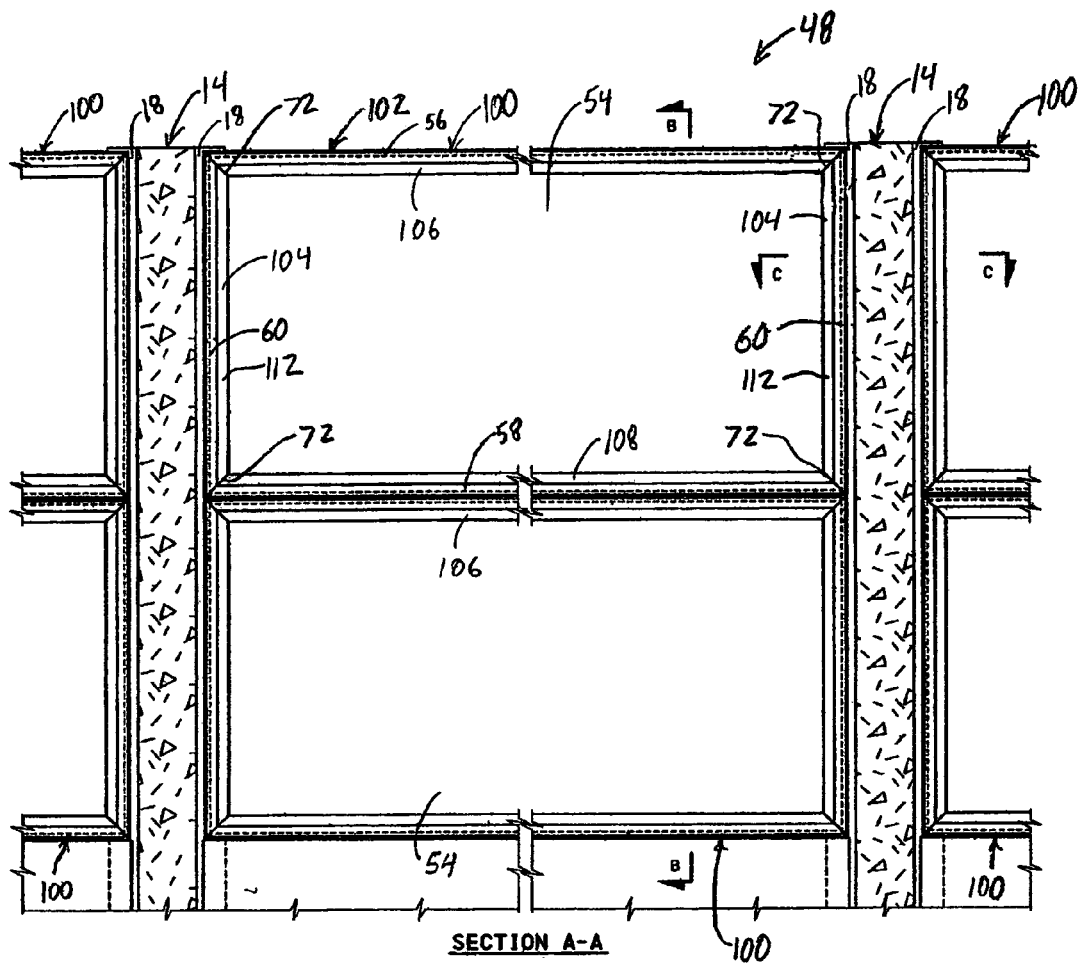
FIG. 8 is a cross-sectional elevation view of a traffic noise barrier wall including panel assemblies in accordance with another embodiment of the present invention.
Figure 9:
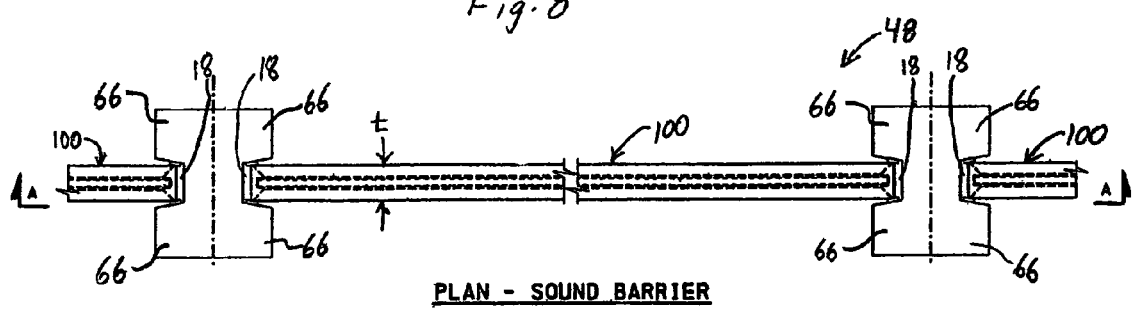
FIG. 9 is a cross-sectional plan view of the traffic noise barrier wall of FIG. 8.

Referring to FIGS. 8 and 9, a traffic noise barrier wall 48 including panel assemblies 100 in accordance with another embodiment of the present invention is shown. The noise barrier wall 48 includes spaced-apart, vertically mounted posts 14 having panel assemblies 100 extending between each pair of posts 14. The panel assemblies 100 each include a sheet 54 of material having top 56, bottom 58, and side edges 60 forming a perimeter of the sheet 54, and a frame 102 disposed around the perimeter of the sheet 54. At least a portion of each of the top, bottom and side edges 56, 58, 60 of the sheet 54 may be captured by the frame 102. Side portions 104 of the frame 102 capture at least a portion of the side edges 60 of the sheet 54 and are received within the opposing slots 18 in drop-down fashion. While, in the embodiment shown, two panel assemblies 100 are disposed between each pair of posts 14, it is contemplated that one or more panel assemblies 100 may be disposed between each pair of posts 14.

The posts 14 may be part of an existing traffic noise barrier wall, with the existing wood or concrete panels 12 (FIG. 1) being replaced with the panel assemblies 100. Alternatively, the posts 14 may be designed specifically for use with the panel assemblies 100. In the posts 14, post flanges 66 extending from the sides of the posts 14 define each of the slots 18. The width of the slots 18 is greater than the thickness "t" of the side portions 104 of the frame 102, with sufficient clearance existing between the frame 102 and the post flanges 66 so that the side portions 102 slide within the slots 18 to allow the drop-down insertion of the panel assemblies 100 into the slots 18. The posts 14 are mounted to a secure base, such as for example, the ground, a concrete platform, a traffic barrier or parapet, or the like. The posts 14 are formed from a rigid material such as, for example, concrete, steel, or wood.

In the embodiment shown, each frame 102 includes a top portion 106, a bottom portion 108, and side portions 104, with each portion 106, 108, and 104 capturing a portion of a respective top, bottom or side edge 56, 58, or 60 of the sheet 54. The ends of each of the portions 104, 106 and 108 interface with the ends of adjacent portions 104, 106 and 108 at mitered joints 72, which form corners of the frame 102. The frame 102 is formed from a rigid material such as, for example, steel, aluminum, fiberglass, plastic and the like. Each mitered joint 72 may be welded, fastened, or otherwise joined to form a continuous, rigid frame 102 around the entire perimeter of the sheet 54.

While frame 102 is shown as including side portions 104 and top and bottom portions 106 and 108 to capture at least a portion of four side edges 56, 58 and 60 of the sheet 54, it is also within the scope of the invention for the frame 102 to only be present on two opposing edges of the sheet 54 or on three edges of the sheet 54. For example, it is contemplated that frame 104 may include only side portions 104 without the top and bottom portions 106 and 108. In this embodiment, only the side edges of the sheet 54 will be captured by the frame 102.

Each sheet 54 is made from an acoustically absorptive and/or reflective material that is appropriate for the individual application of the traffic noise barrier wall 48. For example, sheet 54 may be made of a transparent material where it is desired that travelers on a roadway, railway, aircraft runway, waterway, parking lot, or walkway, adjacent to the wall 48 have a view through the wall 48. One example of a preferred transparent material for use as sheet 54 is PARAGLASS SOUNDSTOP® acrylic sheet. Where transparency is not desired, other materials such as wood, steel, opaque acrylic, plastic, and the like, may be used. The sheet 54 may be corrugated or otherwise shaped for added strength.

Figure 10:
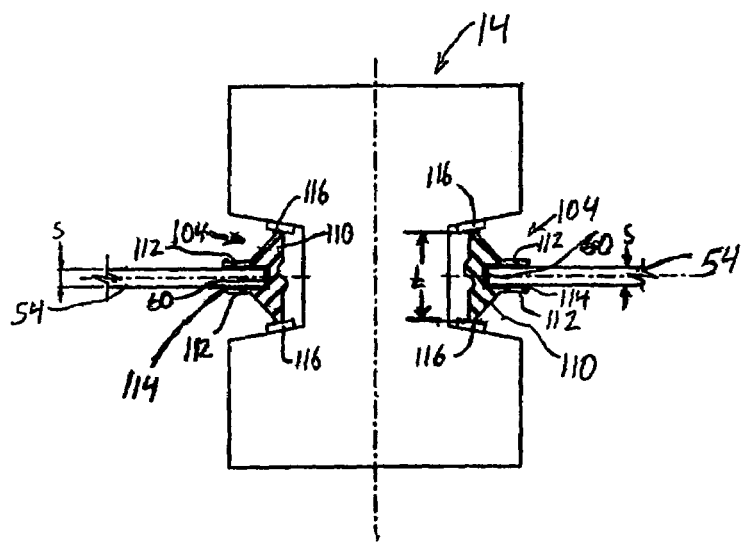
FIG. 10 is a detail view of a portion of the traffic noise barrier wall of FIG. 8.

Referring now to FIG. 10, a cross sectional view of the post 14 and side portions 104 of adjacent frames 102 is shown. Each side portion 104 includes a base portion 110 disposed outside the respective side edge 60 of the sheet 54. Flanges 112 project from the base portion 110 on opposite sides of the sheet 54. The base portion 110 and the flanges 112 form a channel for capturing the side edge 60 of the sheet 54. An elastomeric gasket 114 may cover the side edge 60 of the sheet 54 within the channel to secure the sheet 54 within the channel. The base portion 110 and the flanges 112 are received in the slot 18 of post 14. As shown in FIG. 8, the flanges 112 may extend along the entire side edge 60 of the sheet 54.

In the embodiment depicted in FIG. 10, the base portion 110 has a generally triangular cross-section, with the flanges 112 extending from an apex of the triangle and with the base of the triangle forming the thickness "t" of the side portions 104 of the frame 102. Disposed between each side of the base portion 110 and the post 14 is an elastomeric gasket 116. The elastomeric gasket 116 takes up any space between the base portion 110 and the post 14.

In dimensioning the frame 102 for a particular application, the thickness "s" of the sheet 54 and the thickness "t" of the side portions 104 can be selected for the particular application. For example, where the panel assembly 100 is to replace a wood or concrete panel that is thicker than the sheet 54, the thickness "t" of the side portions 104 can be made equal to the thickness of the wood or concrete panel that the panel assembly 100 is to replace. As a result, the thickness "s" of the sheet 54 may be substantially less than the width of the slots 18.

Because the frame 102 supports a relatively thin sheet 54, the panel assembly 100 is much lighter than the wood or concrete panel that it is to replace. As a result, the load applied by the panel assembly 100 to the posts 14 is less than that which would be applied by the wood or concrete panel. Because the load is less, a greater number of panel assemblies 100 can be used in place of the concrete or wood panels. In other words, if it becomes necessary to increase the height of the wall 48, the concrete or wood panels can simply be removed and replaced with a greater number of panel assemblies 100. If the height of the posts 14 is insufficient to accommodate the increased number of panel assemblies 100, extensions can be added to the tops of the posts 14 to support the increased number of panel assemblies 100. In any case, because the panel assemblies 100 are lighter than the wood or concrete panels, the wood or concrete panels can be replaced without having to perform the costly procedure of removing and replacing the posts 14.

Figure 11:
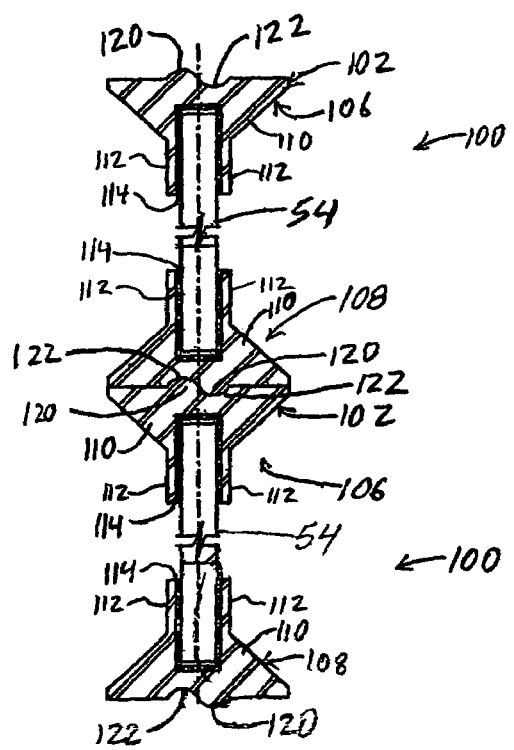
FIG. 11 is a cross-sectional elevation view of a portion of the traffic noise barrier wall of FIG. 8.

Referring to FIG. 11, a cross-sectional view of a bottom portion 108 of one panel assembly 100 is shown proximate a top portion 106 of another panel assembly 100. Such an arrangement may occur when two or more panel assemblies 100 are disposed between a single pair of posts 14, as shown in FIG. 8. Each panel assembly 100 includes a means for interlocking with an adjacent panel assembly 100 to prevent relative movement of the panel assemblies 100 when they are stacked between posts 14. In the embodiment of FIG. 11, the top portion 106 of one frame 102 and the bottom portion 108 of an adjacent frame 102 each includes a protrusion 120 extending therefrom and a recess 122 formed therein. The protrusion 120 on the top portion 106 is received within the recess of the bottom portion 108, and vice-versa.

Comparison of FIGS. 10 and 11 shows that the cross-section of the side portions 104 of FIG. 10 are substantially similar to the cross-section of the top and bottom portions 106, 108 of FIG. 11. In the embodiment of FIGS. 8-11, the base portion 110 and flanges 112 may be formed by extrusion, molding, forging or otherwise shaping a single piece of material to form a unitary structure. It is contemplated that each of the portions 104, 106 and 108 of the frame 102 are substantially similar in construction, with each having a base portion 110 with flanges 112 extending therefrom, and with the associated edge 56, 68, or 60 of the sheet 54 being captured between the flanges 112. Similar to the embodiments of FIGS. 5 and 7, the base portion 110 and flange 112 structure can be pre-formed for use in any of the top, bottom, and side portions 106, 108, and 104 of the frame 102. The formed material can then be cut as needed for any of the portions of the frame 102. Using the same materials for each of the top, bottom, and side portions 106, 108, and 104 of the frame 102 allows manufacturing costs of the frame 102 to be reduced.

Figure 13:
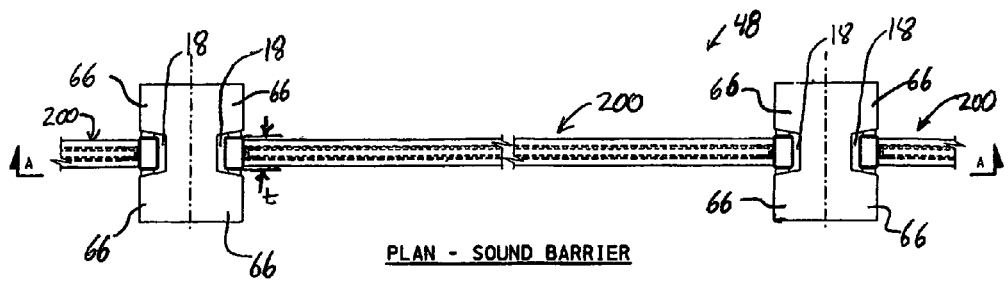
FIG. 13 is a cross-sectional plan view of the traffic noise barrier wall of FIG. 12.
Figure 12:
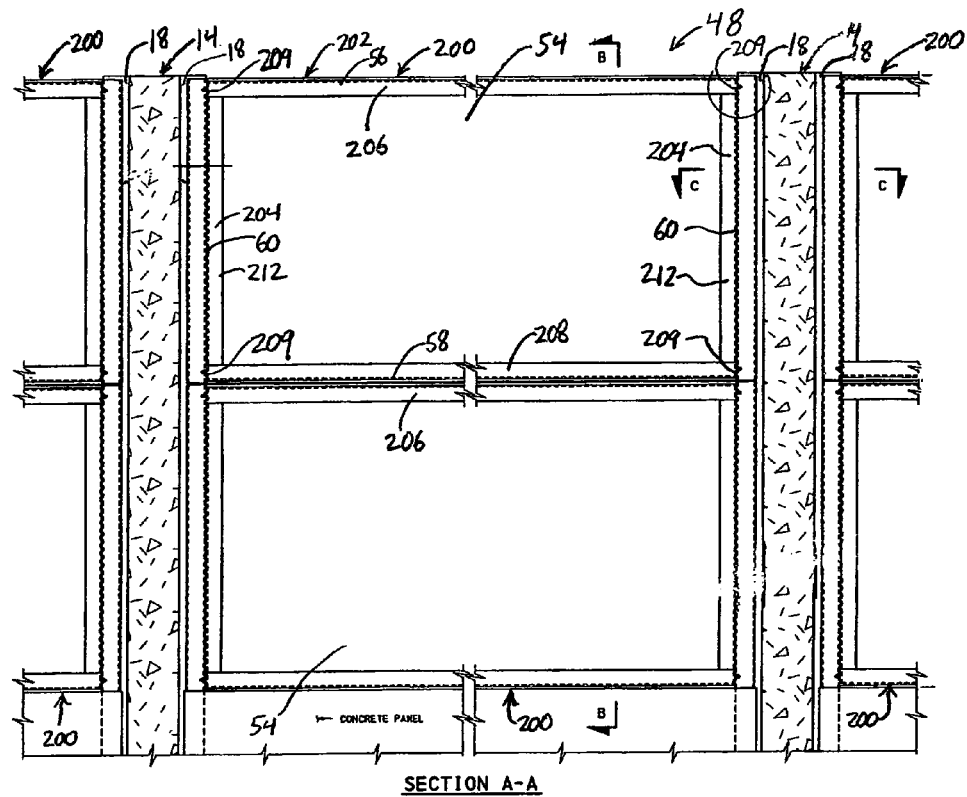
FIG. 12 is a cross-sectional elevation view of a traffic noise barrier wall including panel assemblies in accordance with yet another embodiment of the present invention.

Referring to FIGS. 12 and 13, a traffic noise barrier wall 48 including panel assemblies 200 in accordance with yet another embodiment of the present invention is shown. The noise barrier wall 48 includes spaced-apart, vertically mounted posts 14 having panel assemblies 200 extending between each pair of posts 14. The panel assemblies 200 each include a sheet 54 of material having top 56, bottom 58, and side edges 60, forming a perimeter of the sheet 54, and a frame 202 disposed around the perimeter of the sheet 54. At least a portion of each of the top, bottom and side edges 56, 58, 60 of the sheet 54 may be captured by the frame 202. Side portions 204 of the frame 202 capture at least a portion of the side edges 60 of the sheet 54 and are received within the opposing slots 18 in drop-down fashion. While, in the embodiment shown, two panel assemblies 200 are disposed between each pair of posts 14, it is contemplated that one or more panel assemblies 200 may be disposed between each pair of posts 14.

The posts 14 may be part of an existing traffic noise barrier wall, with the existing wood or concrete panels 12 (FIG. 1) being replaced with the panel assemblies 200. Alternatively, the posts 14 may be designed specifically for use with the panel assemblies 200. In the posts 14, post flanges 66 extending from the sides of the posts 14 define each of the slots 18. The width of the slots 18 is greater than the thickness "t" of the side portions 204 of the frame 202, with sufficient clearance existing between the frame 202 and the post flanges 66 so that the side portions 202 slide within the slots 18 to allow the drop-down insertion of the panel assemblies 200 into the slots 18. The posts 14 are mounted to a secure base, such as for example, the ground, a concrete platform, a traffic barrier or parapet, or the like. The posts 14 are formed from a rigid material such as, for example, concrete, steel, or wood.

In the embodiment shown, each frame 202 includes a top portion 206, a bottom portion 208, and side portions 204, with each portion 206, 208, and 204 capturing a portion of a respective top, bottom or side edge 56, 58, or 60 of the sheet 54. The ends of each of the portions 204, 206, and 208 interface with the ends of adjacent portions 204, 206 and 208 at joints 209, which form corners of the frame 202. The frame 202 is formed from a rigid material such as, for example, steel, aluminum, fiberglass, plastic and the like. Each joint may be welded, fastened, or otherwise joined to form a continuous, rigid frame 202 around the entire perimeter of the sheet 54.

While frame 202 is shown as including side portions 204 and top and bottom portions 206 and 208 to capture at least a portion of four side edges 56, 58 and 60 of the sheet 54, it is also within the scope of the invention for the frame 202 to only be present on two opposing edges of the sheet 54 or on three edges of the sheet 54. For example, it is contemplated that frame 202 may include only side portions 204 without the top and bottom portions 206 and 208. In this embodiment, only the side edges of the sheet 54 will be captured by the frame 202.

Each sheet 54 is made from an acoustically absorptive and/or reflective material that is appropriate for the individual application of the traffic noise barrier wall 48. For example, sheet 54 may be made of a transparent material where it is desired that travelers on a roadway, railway, aircraft runway, waterway, parking lot, or walkway, adjacent to the wall 48 have a view through the wall 48. One example of a preferred transparent material for use as sheet 54 is PARAGLASS SOUNDSTOP® acrylic sheet. Where transparency is not desired, other materials such as wood, steel, opaque acrylic, plastic, and the like, may be used. The sheet 54 may be corrugated or otherwise shaped for added strength.

Figure 14:
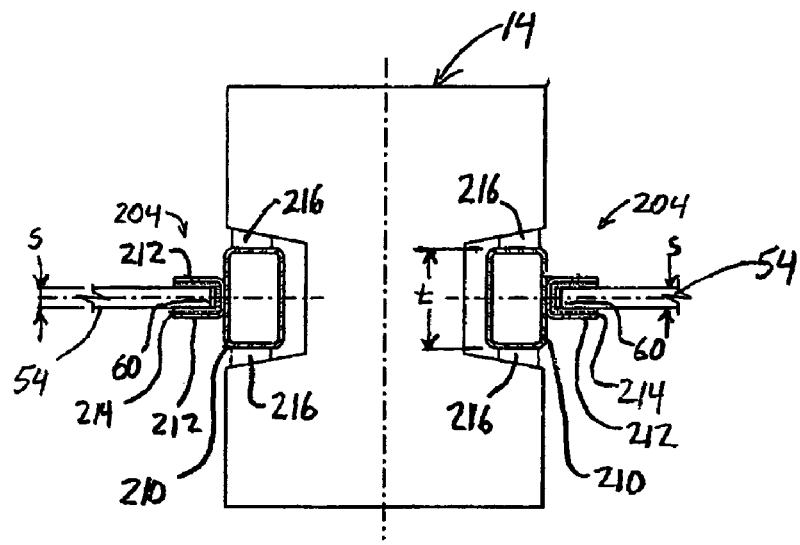
FIG. 14 is a detail view of a portion of the traffic noise barrier wall of FIG. 12.

Referring now to FIG. 14, a cross sectional view of the post 14 and side portions 204 of adjacent frames 202 is shown. Each side portion 204 includes a base portion 210 disposed outside the respective side edge 60 of the sheet 54. Flanges 212 are formed as the ends of a generally U-shaped structure, which is attached to the base 210 by welding, fasteners, and the like. The generally U-shaped structure forms a channel for capturing the side edge 60 of the sheet 54. An elastomeric gasket 214 may cover the side edge 60 of the sheet 54 within the channel to secure the sheet 54 within the channel. The base portion 210 is received in the slot 18 of post 14. As shown in FIG. 12, the flanges 212 may extend along the entire side edge 60 of the sheet 54.

In the embodiment depicted in FIG. 114, the base portion 210 of the side portions 204 is formed from a generally rectangular tube, with the U-shaped structure forming the flanges 212 attached to a planar side of the tube. The thickness "t" of the side portions 204 of the frame 202. Disposed between each side of the base portion 210 and the post 14 is an elastomeric gasket 216. The elastomeric gasket 216 takes up any space between the base portion 210 and the post 14.

In dimensioning the frame 202 for a particular application, the thickness "s" of the sheet 54 and the thickness "t" of the side portions 204 can be selected for the particular application. For example, where the panel assembly 200 is to replace a wood or concrete panel that is thicker than the sheet 54, the thickness "t" of the side portions 204 can be made equal to the thickness of the wood or concrete panel that the panel assembly 200 is to replace. As a result, the thickness "s" of the sheet 54 may be substantially less than the width of the slots 18.

Because the frame 202 supports a relatively thin sheet 54, the panel assembly 200 is much lighter than the wood or concrete panel that it is to replace. As a result, the load applied by the panel assembly 200 to the posts 14 is less than that which would be applied by the wood or concrete panel. Because the load is less, a greater number of panel assemblies 100 can be used in place of the concrete or wood panels. In other words, if it becomes necessary to increase the height of the wall 48, the concrete or wood panels can simply be removed and replaced with a greater number of panel assemblies 200. If the height of the posts 14 is insufficient to accommodate the increased number of panel assemblies 200, extensions can be added to the tops of the posts 14 to support the increased number of panel assemblies 200. In any case, because the panel assemblies 200 are lighter than the wood or concrete panels, the wood or concrete panels can be replaced without having to perform the costly procedure of removing and replacing the posts 14.

Figure 15:
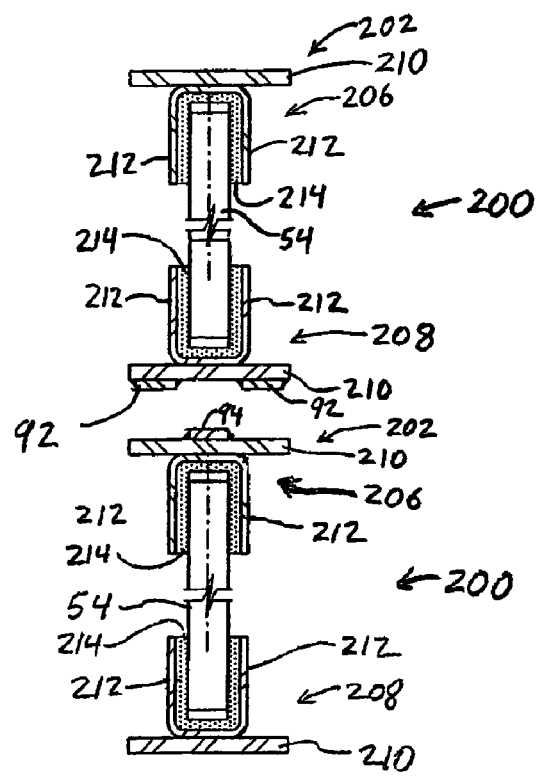
FIG. 15 is a cross-sectional elevation view of a portion of the traffic noise barrier wall of FIG. 12.

Referring to FIG. 15, a cross-sectional view of a bottom portion 208 of one panel assembly 200 is shown proximate a top portion 206 of another panel assembly 200. Such an arrangement may occur when two or more panel assemblies 200 are disposed between a single pair of posts 14, as shown in FIG. 12. The base portion 210 of each of the top and bottom portions 206, 208 is formed from a flat plate, with the U-shaped structure forming the flanges 212 attached to a planar side of the plate. Each panel assembly 200 includes a means for interlocking with an adjacent panel assembly 200 to prevent relative movement of the panel assemblies 200 when they are stacked between posts 14. In the embodiment of FIG. 15, the means for interlocking is substantially similar to that described with reference to FIG. 7, wherein a single protrusion 94 extends between a pair of protrusions 92 when one panel assembly 200 rests on the other panel assembly 200.

The panel assemblies 50, 100, and 200 described herein provide many advantages over panels used in prior art traffic noise barrier walls. The panel assemblies 50, 100, and 200 are of relatively lightweight when compared to the wood or concrete panels typically used in traffic noise barrier walls. As a result, the panel assemblies 50, 100, and 200 allow existing systems to be expanded without having to replace the existing posts and without sacrificing the structural integrity of the existing posts. Also, the frames 62, 102, and 202 of the panel assemblies 50, 100, and 200 are designed to receive any number of different sheets 54, which may include transparent sheets, thus allowing for flexibility in the type of barrier used in the wall. The replacement of existing wood or concrete panels can be accomplished without modification of the posts 14, using the same drop-down assembly technique.

A number of embodiments of the present invention have been described. Nevertheless, it will be understood that various modifications may be made without departing from the spirit and scope of the invention. Accordingly, other embodiments are within the scope of the following claims.

What is claimed is:

1. A panel assembly for a traffic noise barrier wall of the type including opposing slots formed in pairs of vertically-mounted posts, the panel assembly comprising:

a sheet of material having top, bottom, and side edges forming a perimeter of the sheet, said sheet having a sheet thickness that is less than each of said first slot width and said second slot width, and a frame disposed along at least a portion of the perimeter of the sheet, wherein side portions of the frame include a base portion disposed along one of the side edges of the sheet and first and second flange portions projecting outward from the base portion on opposite sides of the sheet to define a channel between said first and second flange portions for capturing at least a portion of the side edges of the sheet, said frame having an overall thickness that is substantially equivalent to said base portion, said base portion having a substantially triangular cross-section, and said first and second flange portions extending from an apex of said base portion.

2. The panel assembly of claim 1, wherein the sheet has a thickness less than a thickness of the first flange and less than a thickness of the second flange.

3. The panel assembly of claim 1, wherein an elastomeric gasket is disposed between the outer surfaces of the side portions of the frame and surfaces forming the channel.

4. The panel assembly of claim 1, wherein an elastomeric gasket covers at least a portion of the side edge of the sheet captured within the channel.

5. The panel assembly of claim 1, wherein the base portion is disposed outside the entire perimeter of the sheet, and the channel formed by the base portion and the first and second flanges capture a portion of each of the top, bottom, and side edges of the sheet.

6. The panel assembly of claim 5, further comprising:
at least one of a protrusion and a recess disposed on the base portion for interlocking with a second panel assembly.

7. The panel assembly of claim 1, wherein the sheet is formed from a transparent material.

8. The panel assembly of claim 1, wherein the frame extends along the entire perimeter of the sheet and captures at least a portion of each of the top, bottom and side edges of the sheet.

\* \* \* \* \*